(12) United States Patent
Marmigere et al.

(10) Patent No.: US 8,606,766 B2
(45) Date of Patent: Dec. 10, 2013

(54) METHOD AND SYSTEM TO HANDLE JAVA CLASS VERSIONING

(75) Inventors: Gerard Marmigere, Drap (FR); Olivier Oudot, Vallauris (FR); Joaquin Picon, St. Laurent du Var (FR); Vincent Tassy, Cagnes sur mer (FR)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 13/395,486

(22) PCT Filed: Jul. 8, 2010

(86) PCT No.: PCT/EP2010/059816
§ 371 (c)(1),
(2), (4) Date: Mar. 12, 2012

(87) PCT Pub. No.: WO2011/042228
PCT Pub. Date: Apr. 14, 2011

(65) Prior Publication Data
US 2012/0185450 A1 Jul. 19, 2012

(30) Foreign Application Priority Data
Oct. 6, 2009 (EP) .................................... 09305947

(51) Int. Cl.
*G06F 7/00* (2006.01)
(52) U.S. Cl.
USPC ....................................................... 707/695

(58) Field of Classification Search
USPC .......................................................... 707/695
See application file for complete search history.

(56) References Cited

U.S. PATENT DOCUMENTS

| | | |
|---|---|---|
| 5,974,428 A | 10/1999 | Gerard et al. |
| 7,207,002 B2 | 4/2007 | Mireku |
| 2006/0123067 A1 | 6/2006 | Ghattu et al. |
| 2006/0150164 A1 | 7/2006 | Agrawal |
| 2006/0218538 A1 | 9/2006 | van Kesteren |

OTHER PUBLICATIONS

Elzbieta Sogno-Pabis, PCT Notification of Transmittal of the International Search Report and the Written Opinion of the International Searching Authority, or the Declaration, Date of Mailing Sep. 6, 2010, 9 pages.

*Primary Examiner* — Robert Beausoliel, Jr
*Assistant Examiner* — Nirav K Khakhar
(74) *Attorney, Agent, or Firm* — Douglas A. Lashmit; Hoffman Warnick LLC

(57) ABSTRACT

There is disclosed a method of handling a given object class in an object-oriented environment, wherein it comprises, in response to the invocation of the given object class during runtime, the steps of: determining if the version associated with the given object class differs from a predefined minimal version and if so: (a) generating a new version of the object class from the previous version of the object class by invoking an interface method migrating an object class from a version to another; (b) extending the new object class by updating pointer links to the previous version of the given object class. The previous version of the object class may be maintained accessible after the object migration.

17 Claims, 9 Drawing Sheets

METHOD AND SYSTEM TO HANDLE JAVA CLASS VERSIONING

FIELD OF THE INVENTION

The present invention generally relates to object oriented computer programming and in particular to methods and systems of handling java class versioning.

BACKGROUND ART

During runtime, class files are loaded into a memory device when an instance of a class is created. In particular, a first class file can be loaded into the memory device. Thereafter, if another class file calls the first class file but expects that the first class file is an updated version but is actually not an updated version, a software exception error can undesirably occur.

Versioning techniques available today mostly rely on development best practices to ensure backward compatibility. When developing a new version of a Java class, it is up to the developer to maintain backward compatibility, to make sure that class signatures match, to check whether modification of existent code may impact other applications relying on the current class version.

Prior art solutions are known for handling java class versioning. U.S. Pat. No. 7,207,002 discloses techniques for serializing objects (such as Java objects), and deserializing those objects, in a manner that enables contents of the objects to be preserved following changes to definitions of the object structures. Objects are serialized. The serialized objects thereby capture class definition information for the class definition which was in effect when the object was serialized. Subsequently, if the class definition is changed, it is possible to deserialize the information from the markup language document to an object that uses the new class definition, without requiring access to a programming language specification of the now-obsolete class definition.

US20060218538 discloses a method for converting an object. In one embodiment, information is obtained from an object that identifies a first version of code associated with the object.

Using the obtained information, a minimized class and converter class are identified for converting the object from a first format associated with the first version of code to a second format associated with a second version of the code. The minimized class is utilized to read the object in the first format and the converter class is utilized to convert the read object into the second format. The use of such a converter handles cases where an object needs to be transferred between two software applications of different versions.

These solutions both refer to the serialization of Java objects, when these objects are transferred from one Java runtime to a different one, using a different version of the object class. However, these solutions do not allow for handling java class versioning at a same runtime.

SUMMARY

In order to address these and other problems, there is provided a method of handling a selected object class in an object-oriented environment during runtime, a computer program, a computer readable medium and a system. Additional embodiments are defined in the appended dependent claims.

Accordingly, the invention does not involve serialization. Indeed, according to the invention, an object is migrated inside the same runtime environment, when different versions of a class are coexisting because loaded through different libraries. Java classes version mismatch is now handled at runtime, while existing solutions refer to the serialization of Java objects (when these objects are transferred from one Java runtime to a different one, using a different versions of the object class).

With the invention, multiple versions of the same class can coexist inside a same Java Virtual Machine (JVM). A class can be associated to a version number. A minimal class version can be specified by client code at import level. According to the invention, the class loader is modified to check the called (or required or invoked or accessed) version (number) and load a new one if needed. Multiple versions of the same class may coexist because their internal name is extended with the version number. When creating a new object, the highest class version is used by default but the class definition pattern is extended by appending a version number to the name of the class in the form ":x". This enables the coexistence of multiple class versions. It is another advantage of the invention to extend the Java import statement to specify the called (or required or invoked or accessed) class version, or a range of versions. According to certain embodiments of the invention, there is also enabled the loading of multiple versions of the same class at runtime. This avoids the dissemination of code in different class versions.

It is another advantage to migrate existing objects to a higher class version, on necessity and at runtime. Indeed, according to certain embodiments of the invention, an object is promoted or migrated from one class version to another class version at runtime. More specifically, a minimal class version is checked and an object is promoted or migrated from one class version to another class version if a higher class version is required. Further, pointers are provided by the older/basic object to previous version and next version of an object. The older object is kept accessible after the object migration. An object can thus be dynamically promoted at runtime. The Class version is checked at every object access or invocation. If the client code needs a higher version, a new object is created from the old one using the interface method promote ( ). It is thus an advantage of the invention to extend an old version of a class to enable upward compatibility between versions.

Another advantage of the invention is to leverage compiler validation mechanisms to ensure the considered and desired compatibility. Further, a java class compiler is provided with the features of validating the various versions of a java class and of extending the inheritance definition to support multiple versions with the same class name. The compiler is modified to embed in the generated byte code the actual version of a class to load. Multiple versions of the same class may then coexist because their internal name is extended with the version number. When creating a new object, the highest class version is used by default. It is another advantage of the invention to extend the inheritance definition to support class versions. This allows a class to explicitly extend a previous version of the same class. This further ensures backward compatibility of the multiple class versions and avoids code dissemination.

It is an advantage of the invention to detect differences between the old version and the new version. It is a further advantage to migrate an existing object to a higher version by adding only the missing parts (i.e. differences between the old version and the new version).

Further advantages of the invention will become clear to the skilled person upon examination of the drawings and detailed description. It is intended that any additional advantages be incorporated therein.

BRIEF DESCRIPTION OF THE DRAWINGS

Embodiments of the present invention will now be described by way of example with reference to the accompanying drawings in which like references denote similar elements, and in which.

DETAILED DESCRIPTION

Figure 1:
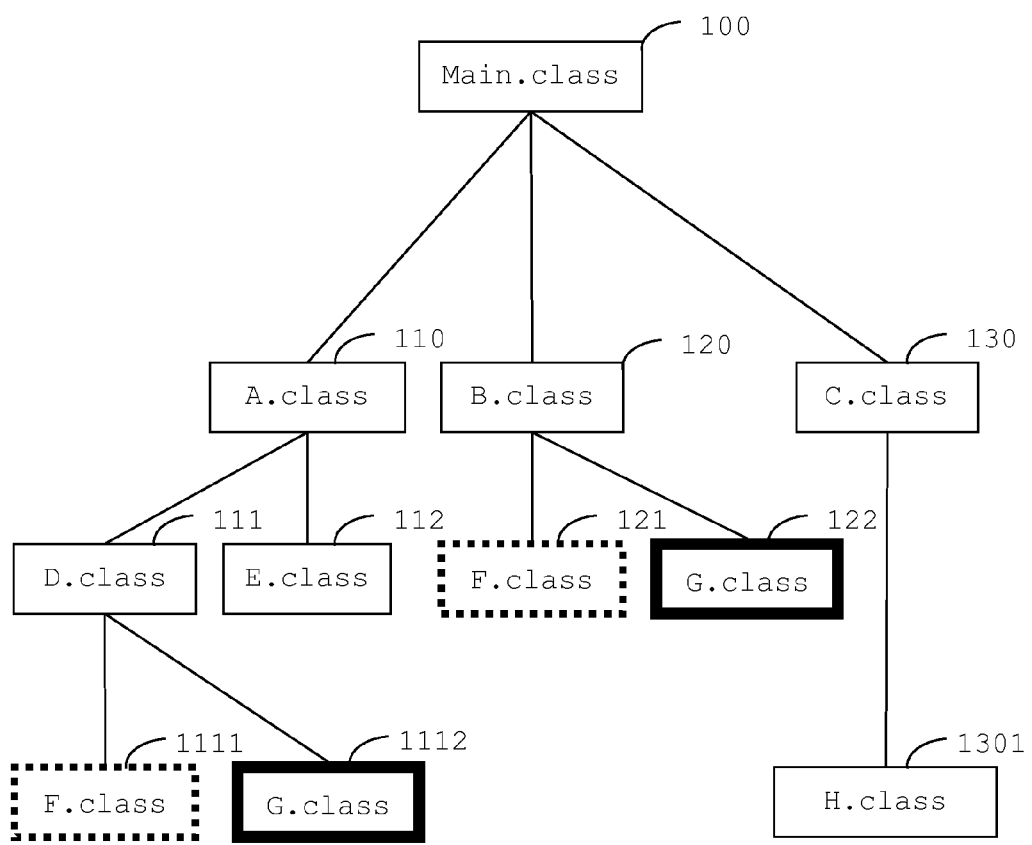
FIG. 1 shows an exemplary java application comprising class files.

The present invention provides a method and a system for handling class versioning in an object-oriented programming language.

The following description will be made with reference to Java environment, Java classes and Java class files, for illustrative purpose only. However, the skilled person will readily understand that the invention is also applicable to any equivalent language or object environment, including in particular any alternative to Java and any type of classes or class files.

To facilitate understanding of the detailed description of a certain preferred embodiments, there follow definitions of certain expressions used thereinafter:

Java is a programming language originally developed Sun Microsystems. Java applications are typically compiled to byte code that can run on any Java virtual machine (JVM) regardless of computer architecture ("write once, compile it once, and run it anywhere").

A Java Virtual Machine (JVM) designates a set of computer software programs and data structures which use a virtual machine model for the execution of other computer programs and scripts. The model used by a JVM accepts a form of computer intermediate language commonly referred to as Java byte code. The JVM is a crucial component of the Java Platform. The JVM enables unique features such as Automated Exception Handling which provides 'root-cause' debugging information for every software error (exception) independent of the source code. The JVM is distributed along with a set of standard class libraries which implement the Java API (Application Programming Interface). The virtual machine and API have to be consistent with each other and are therefore bundled together as the Java Runtime Environment.

A Java byte code represents the form of instructions that the Java Virtual Machine executes. This language conceptually represents the instruction set of a stack-oriented, capability architecture.

Class libraries designate reusable code which is typically provided as a set of dynamically loadable libraries that applications can call at runtime. In computer science, a library is a collection of subroutines or classes used to develop software. Libraries contain code and data that provide services to independent programs. This allows code and data to be shared and changed in a modular fashion. Most libraries are not executables. Executables and libraries make references known as links to each other. Because the Java Platform is not dependent on any specific operating system, applications cannot rely on any of the pre-existing OS libraries. Instead, the Java Platform provides a comprehensive set of its own standard class libraries containing much of the same reusable functions commonly found in modern operating systems. The Java class libraries serve three purposes: they provide a set of functions to perform common tasks; they provide an abstract interface to tasks that would normally depend heavily on the hardware and operating system (for example network access tasks); when some underlying platform does not support all of the features a Java application expects, the class libraries work to gracefully handle the absent components, either by emulation to provide a substitute, or at least by providing a consistent way to check for the presence of a specific feature. Java libraries are the compiled byte codes of source code developed by the JRE implementor to support application development in Java. There are: core libraries, integration libraries, User Interface libraries, etc.

For purposes of understanding, the term "class" refers an object-oriented class. The term "class file" refers to an executable file or object instantiated from a class. The term "class name" refers to an identifier utilized to identify a class, such as a class "A" for example. The term "version number" refers to a version number associated with a class or class file. A class file can have a class file name formed utilizing a class name and a version number. For example, a class file named D_00.01.02 belongs to a class "D" with a version number of 00.01.02.

For the sake of clarity and simplicity, when referring to the expression "version" the term "number" may be omitted (in particular when discussing about comparisons of versions). An "older" version conveys the meaning of "less recent"; it corresponds most of the time to a version number which is "inferior" than the one considered at present time. To the contrary, a version number which is "superior" (or greater than) indicates or conveys the meaning of "more recent". It is observed that version numbering may correspond to an arbitrary choice since other naming conventions may be chosen. Consistency of the labeling only matters in this perspective. An assessment of the "age" (older/newer) or the "novelty" or the "up-to-date" characteristics of an object may be assessed by various means, such as hash comparisons or length of messages/contents/lines of codes (by way of example) or database of reference retrieval, etc.

Java is a trademark of Sun Microsystems. Other company, product or service names may be the trademarks or service marks of others.

FIG. 1 shows an exemplary java application comprising class files.

The Java application comprises a main class file 100 and additional class files 110, 120, 130, 111, 112, 121, 122, 1111, 1112 and 1301.

A class file is a set of compiled files of associated routines within the Java source file 100. As shown, the class file includes a class file 100 referred to as "main.class", a class file 110 referred to as "A.class", a class file 111 referred to as "D.class", a class file 112 referred to as "E.class", a class file 1111 referred to as "F.class", a class file 1112 referred to "G.class", a class file 120 referred to as "B.class", a class file 121 referred to as "F.class", a class file 122 referred to as "G.class," a class file 130 referred to as "C.class", and a class file 1301 referred to as "H.class".

During operation, the Java application executes the class file main.class that utilizes the following class files: A.class, B.class and C.class. The class file A.class calls the class files D.class and E.class. The class file B.class calls the class files F.class and G.class. Further, the class file D.class calls the class files F.class and G.class. As shown, some class files may be used by different classes. For example, the class files F.class and G.class are utilized by both the D.class and B.class.

A first mechanism to handle java class versioning is to consider data indicating highest version of a class file.

More specifically, a called class file table is loaded with data indicating a highest version of a class file of the software application.

A first class version dependency file associated with a first class file is further retrieved. The first class version dependency file has both a first class name and a first version number associated with a second class file that is called by the first class file. A first record to the called class file table having both the first class name and the first version number associated with a second class file is then added.

A second class version dependency file associated with a third class file is further retrieved. The second class version dependency file has both a second class name and a second version number associated with a fourth class file called by the third class file. If the second class name is identical to the first class name in the called class file table and the second version number is higher than the first version number, then the first record in the called class file table with the second class name and the second version number associated with the fourth class file are updated.

Figure 2:
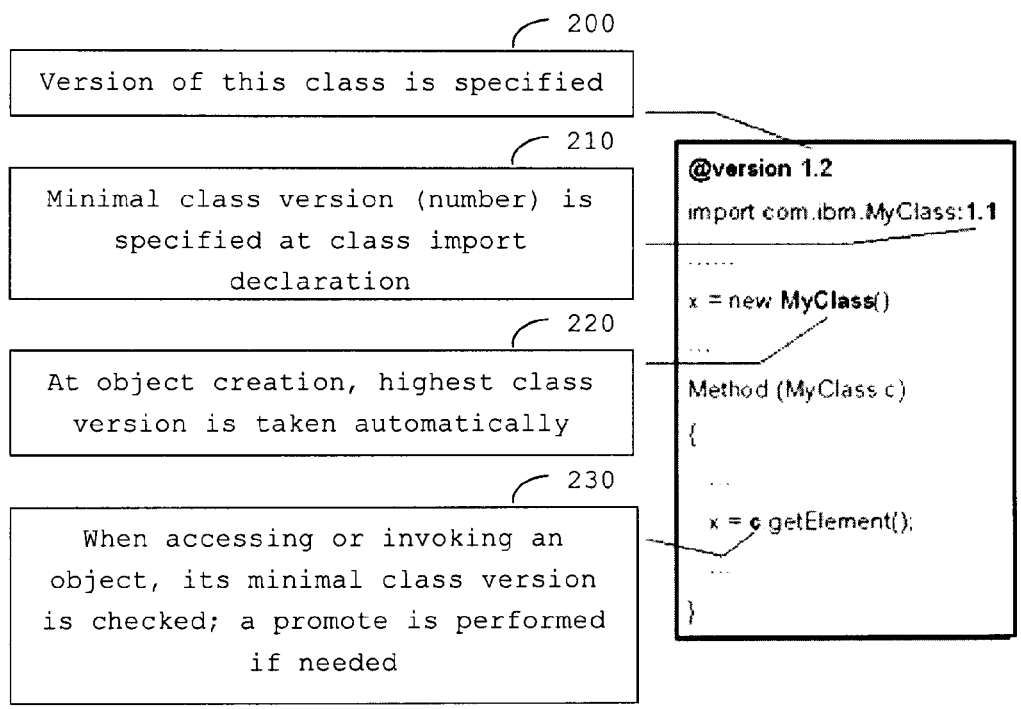
FIG. 2 is a flowchart illustrating a migration and promotion mechanism according to certain embodiments of the invention.

FIG. 2 is a flowchart illustrating a migration and promotion mechanism according to certain embodiments of the invention.

At step 200, the version of the class is specified. Then, at step 210, the minimal class version is specified at class import declaration. Step 220 automatically takes, at object creation, the highest class version, and then, at step 230, when accessing/invoking an object, its minimal class version is checked. A promote may be performed if needed.

The above mechanism enables a migration between versions. A specific Java interface "Promotable" containing a method "promote( )" is implemented to convert object from older class versions to the new one.

The Class loader may be modified. It checks if a called or required class level is available and loads it if needed.

The Object access or invocation is modified. When needed, there is converted existing objects from older class version to the new one through a call to the promote method. The basic class Object is extended to provide pointers on previousVersion and nextVersion of each object.

Figure 3:
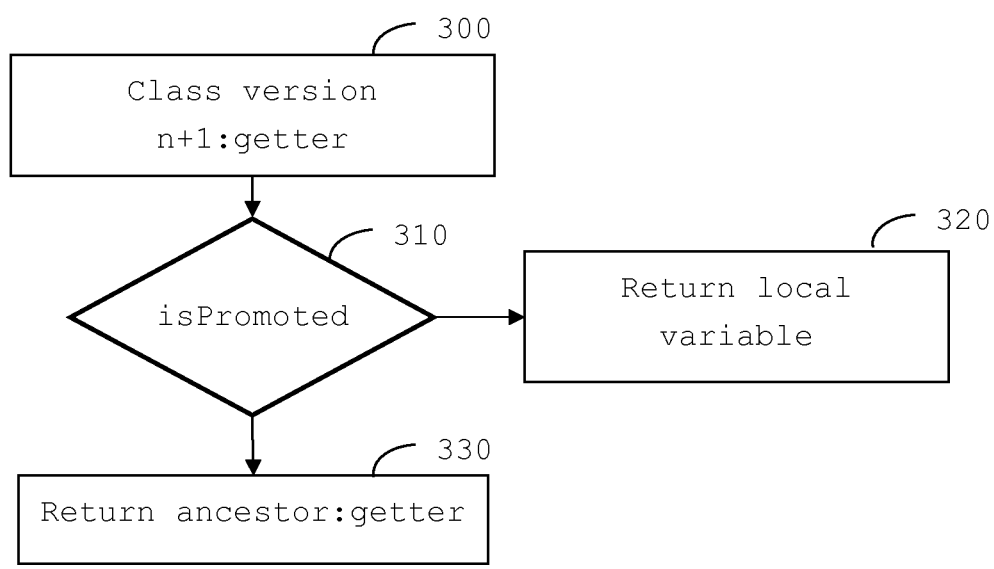
FIG. 3 illustrates the promotion of objects.

FIG. 3 illustrates the promotion of objects.

The interface <<Promotable>> allows migrating objects from a version to another as defined by the exemplary code below:

```
public interface Promotable
{
/** Promote an older object to this class version.
** This method initializes this object with the content
of an existing object of the same
** class but with a previous version.
** @param obj Object with older class version
*/
void promote (Object obj);
}
```

The above example defines an object promotion mechanism.

At runtime, every object access or invocation causes a check against the minimal called version. This checking step is generated or performed by the compiler, only when a particular class version is called (or required or invoked or accessed).

If there is a version mismatch, a new object is created on top of the old one to contain data added in the higher class version. Its interface method promote ( ) is called to perform the migration (following link "nextVersion"). The old object is still accessible by existing clients. Links "previousVersion" and "nextVersion" are updated in the new object to allow further version changes if needed. To keep or maintain compatibility, typical implementation still refers to "previousVersion" to access or invoke elements that are existing in it.

Class attributes should be accesses through getters/setters. If an object has been promoted, it is referred to the ancestor to set/get data that is available in both versions. The implementation of the promote method should sets the reference to the ancestor.

Figure 4:
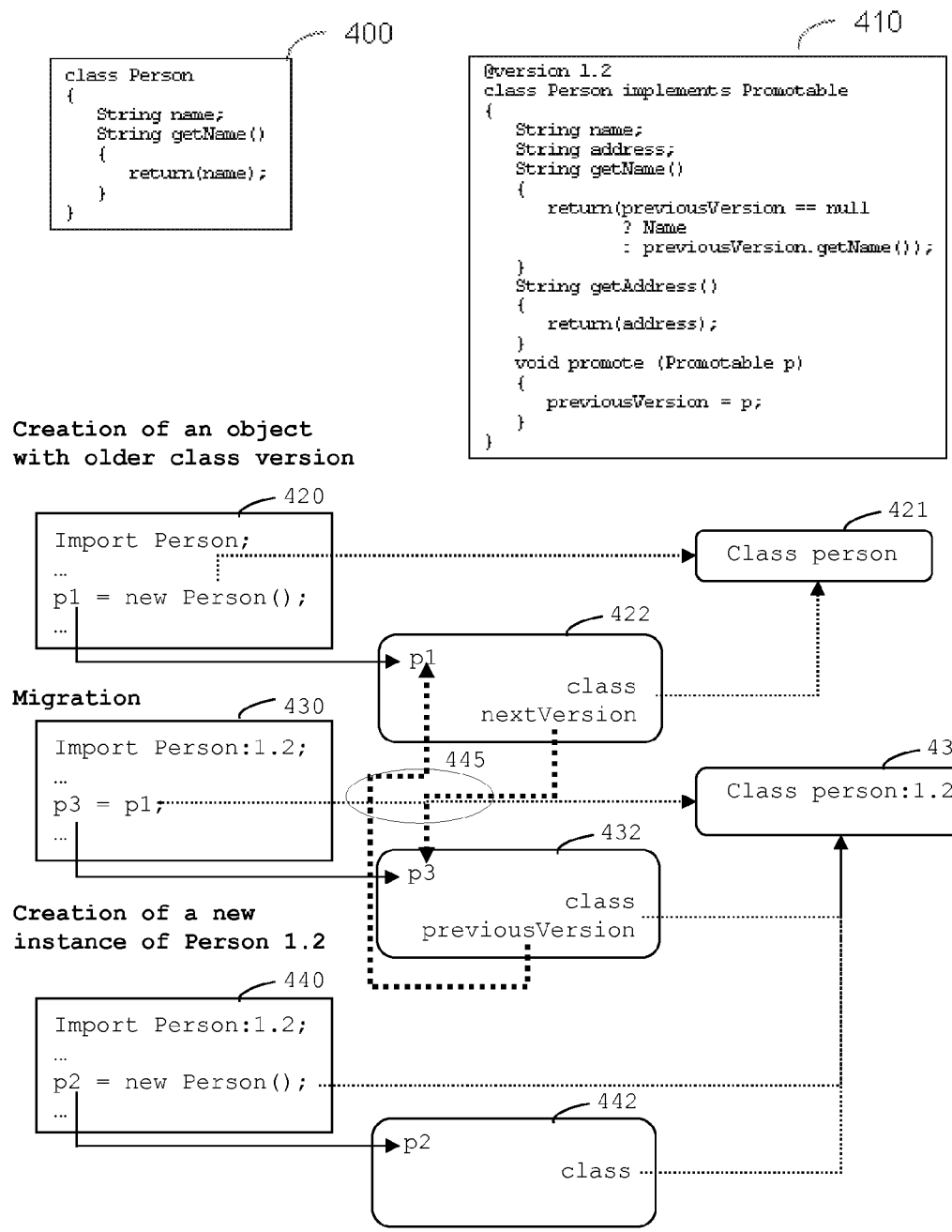
FIG. 4 illustrates an examplary promotion of objects.

FIG. 4 illustrates an examplary promotion of objects, comprising an element 400 which is the initial version of a class Person, and an element 410 which represents a new version of this class (which implements a mechanism for promoting an existing object with older class version).

The element 420 provides an example of source code creating an instance named p1 of the initial version of the class Person represented by element 421. The object instance itself is represented by element 422.

The element 430 is another piece of source code that explicitly references a newer version of the class person and where the instance created at step 420 (variable p1) is referenced. This triggers the migration of the older object into a new one. A new instance is created, represented by 432, which reference the newer version of the class represented by 431. As this object has been promoted, the Java Virtual Machine automatically calls the method promote( ) in the new object 432, passing as parameter the older version of the object. Links between old and new instance 445 are established, allowing both of them to coexist and to preserve existing references.

The element 440 is a piece of code which represents the creation of a new object instance directly using the new class version represented by element 431. In this case, the object represented by element 442 is directly created with the class 431, with no promotion mechanism invoked.

The method according to certain embodiments of the invention therefore allows for handling a selected object class in an object-oriented environment during runtime. Upon version mismatch (between expected and accessed object classes), an object class is generated from an older version version of the object class by invoking a promote interface method migrating object class from a version to another and extending the selected object class by updating pointer links to a previous version and to a next version of said object class. This enables to maintain backward compatibility and accessibility of multiple valid concurrent class versions. The older object class is maintained accessible after the object migration.

A same object can be exchanged or accessed by different programs, although the object has different versions. The older version of the object is an object of the same nature as other objects; the most recent object has got a link or pointer or another characteristics designating the older version.

All versions (past and present versions) are "maintained accessible". This last expression conveys the meaning, in addition to its common sense, that the different versions are stored in memory and that they are able to be retrieved or reconstructed. The term "memory" primarily encompasses non-persistent memory means (RAM for example), but it also designates forms of persistent storage means (hard drive, flash memory, etc)

Figure 5:
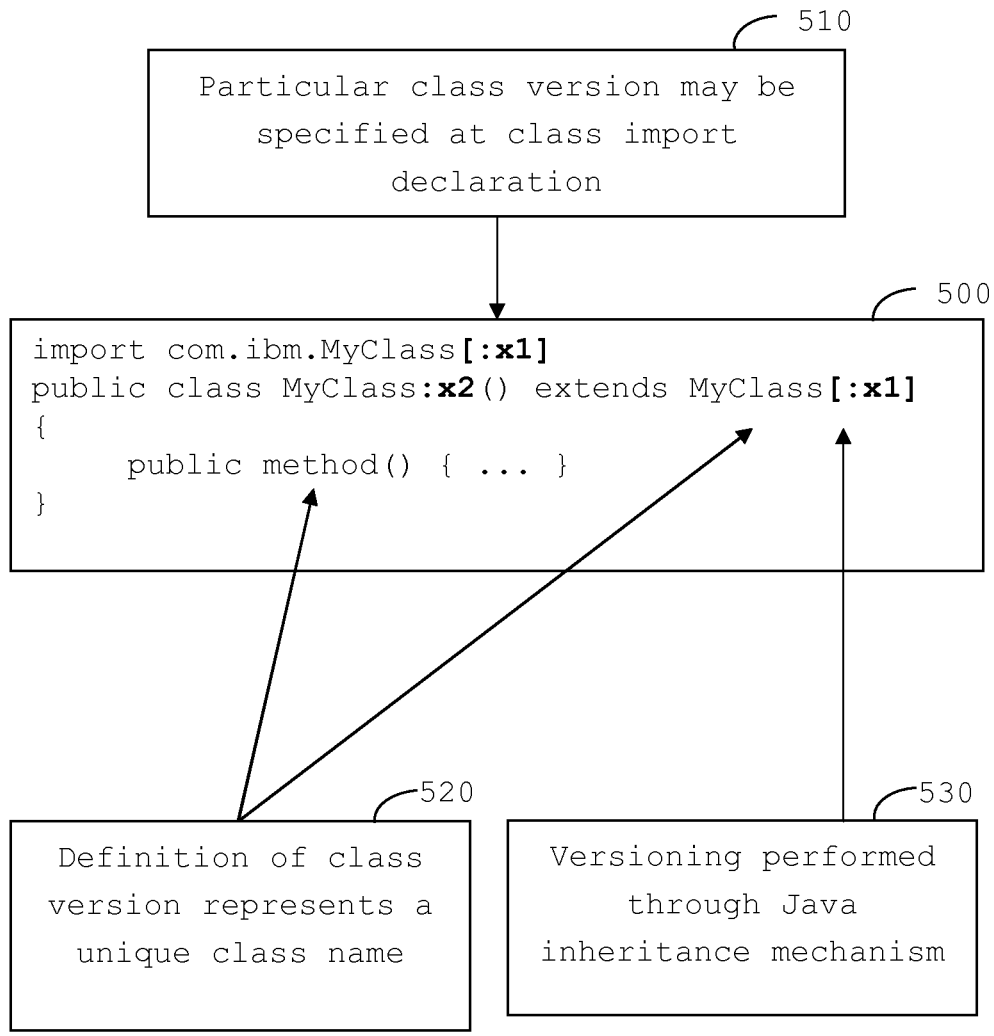
FIG. 5 illustrates a java compiler which extends the definition of inheritance to support multiple versions with the same class name.

FIG. 5 illustrates a java compiler which extends the definition of inheritance to support multiple versions with the same class name.

The inheritance mechanism according to certain embodiments of the invention provides an extension of the class definition pattern. This mechanism further adds the possibility to append an optional version number to the name of the class in the form ":x", which enables the coexistence of multiple class versions.

This inheritance mechanism further provides an extension of the inheritance definition to support class versions. This allows a class to "extend" a class with similar name with lower version number or no version at all. This enables the backward compatibility of the multiple class versions and avoids code dissemination. It also minimizes efforts on the developer side by leveraging compiler validation.

The inheritance mechanism according to certain embodiments of the invention also provides an extension of the import statement pattern to support versioning. It provides the developer with the ability to request a particular version of the class by specifying the number in the form ":x". If no version number is supplied on the import statement, the highest version available on the build path is assumed.

According to the invention, the compiler is also enhanced to support the extensions described previously. Versioned classes are treated as individual classes and there is applied a traditional inheritance.

The element 500 is an example of source code where a new version of the class MyClass is defined by extending an older version. The distinction between the two versions of the same class is realized by appending an optional string ":<version_id>" at the end of the class name. If this version id is not given after the class name, the compiler takes by default the most recent version of the class, with the higher version number.

Element 510 focuses on the import directive that allows to optionally specifying a particular version of MyClass. If the version id is not given, the compiler uses the most recent version of the class.

Element 520 and 530 focus on the fact that both older and newer versions of the class are coexisting in the system. It is always possible to explicitly reference a particular version by appending the version id, and the inheritance mechanism assures the compatibility of newer version with older ones.

Figure 6:
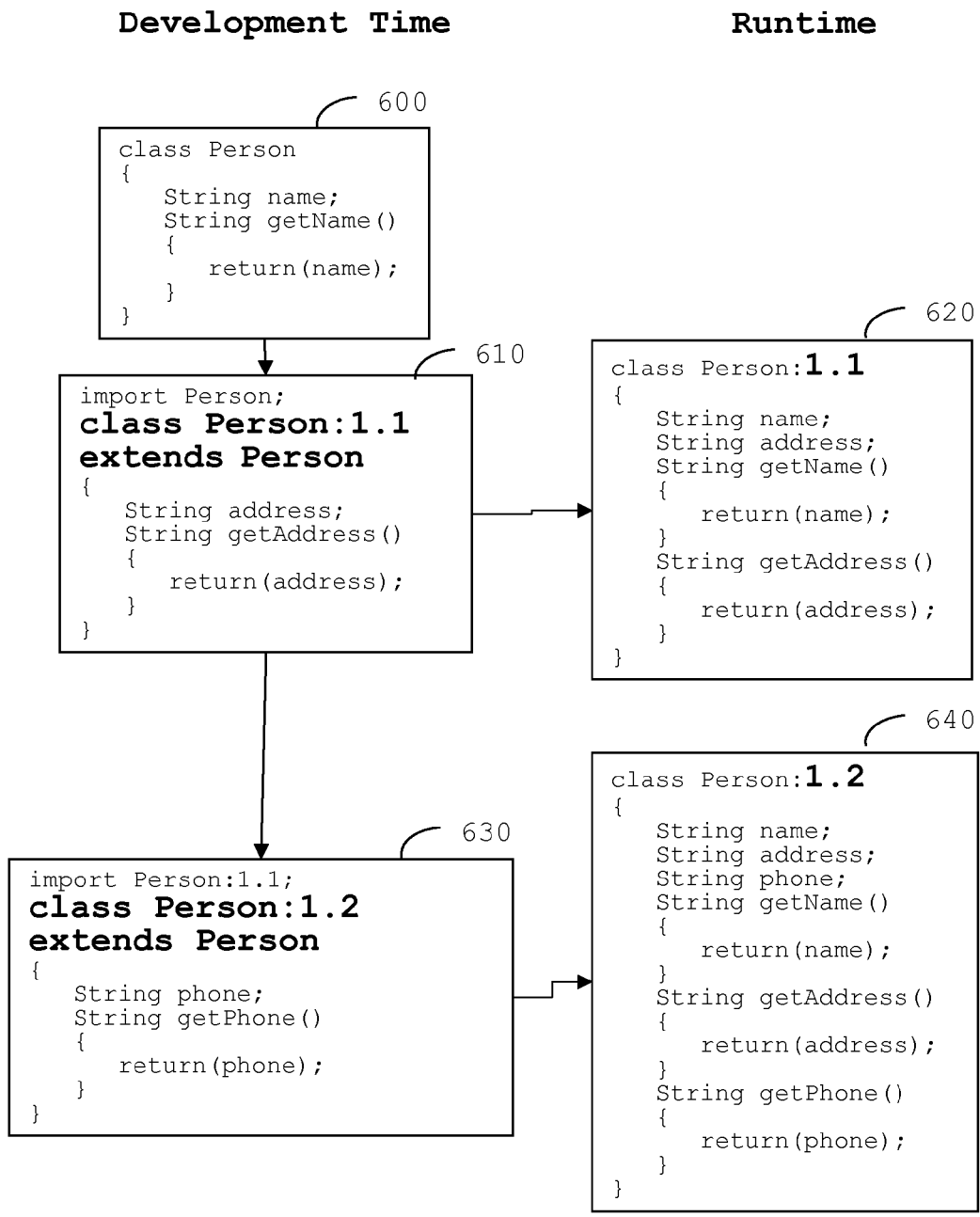
FIG. 6 illustrates the inheritance mechanism at compilation time and at runtime, in accordance with certain embodiments of the invention.

FIG. 6 illustrates the inheritance mechanism at compilation time and at runtime, in accordance with certain embodiments of the invention.

The element 600 represents the initial version of the class Person. The element 610 is an implementation of a first version "Person:1.1" implemented on top of Person. Element 620 represents an instance of this class "Person:1.1" as created in a Java runtime environment, containing all attributes and methods of Person and extensions of "Person:1.1.".

Element 630 is a more recent version of Person, named "Person:1.2", built by extending "Person:1.1". Element 640 shows its representation in the Java runtime, including all attributes and methods from the initial class Person, and also extensions provided in "Person:1.1" and "Person:1.2". But for the JVM and a compiler using this last version, this class "Person:1.2" can be accessed using only the atomic name Person.

Figure 7:
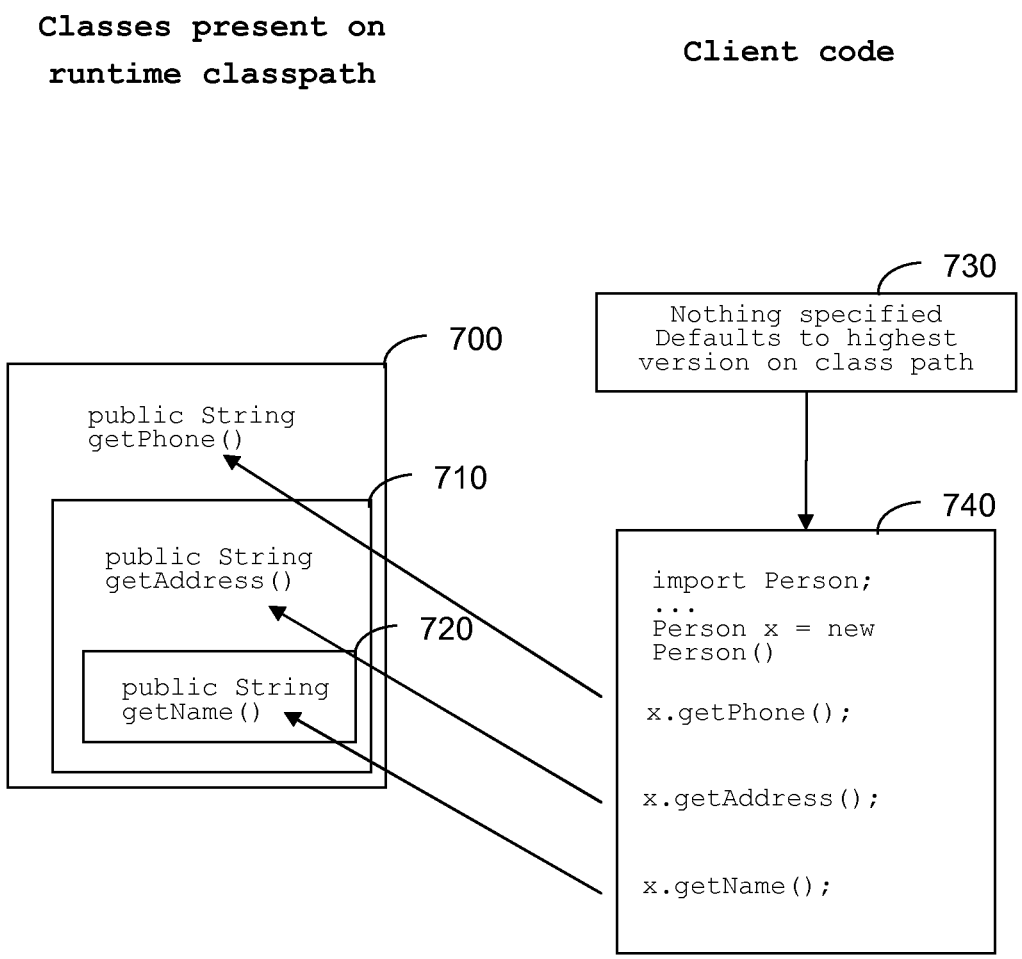
FIG. 7 illustrates a client view.

FIG. 7 illustrates a client view.

The element 700 represents the last version of the class Person, named "Person:1.2" in the previous example, including all methods getPhone( ), getAddress( ), and getName( ). The figure shows how this class extends the class "Person: 1.1" represented by the element 710, itself extending the class Person represented by 720.

On the client side, element 740 is an example of source code that only references the class Person. As the highest version available is the "version 1.2", then all the features of this class (the three methods) are available to the client.

Figure 8:
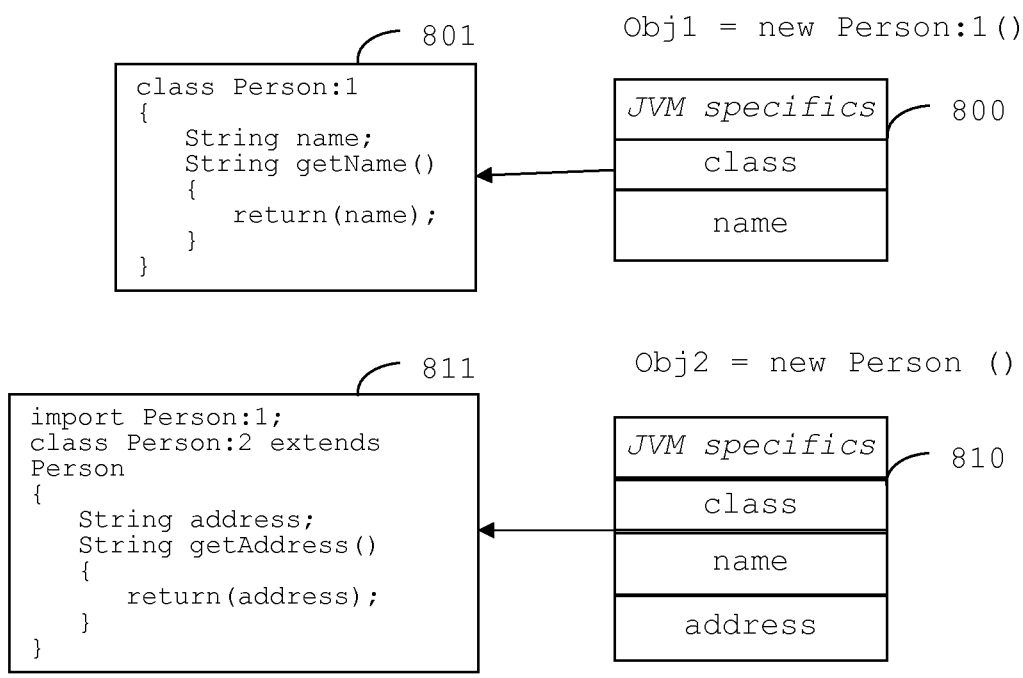
FIG. 8 shows coexistence of the different class versions.
Figure 9:
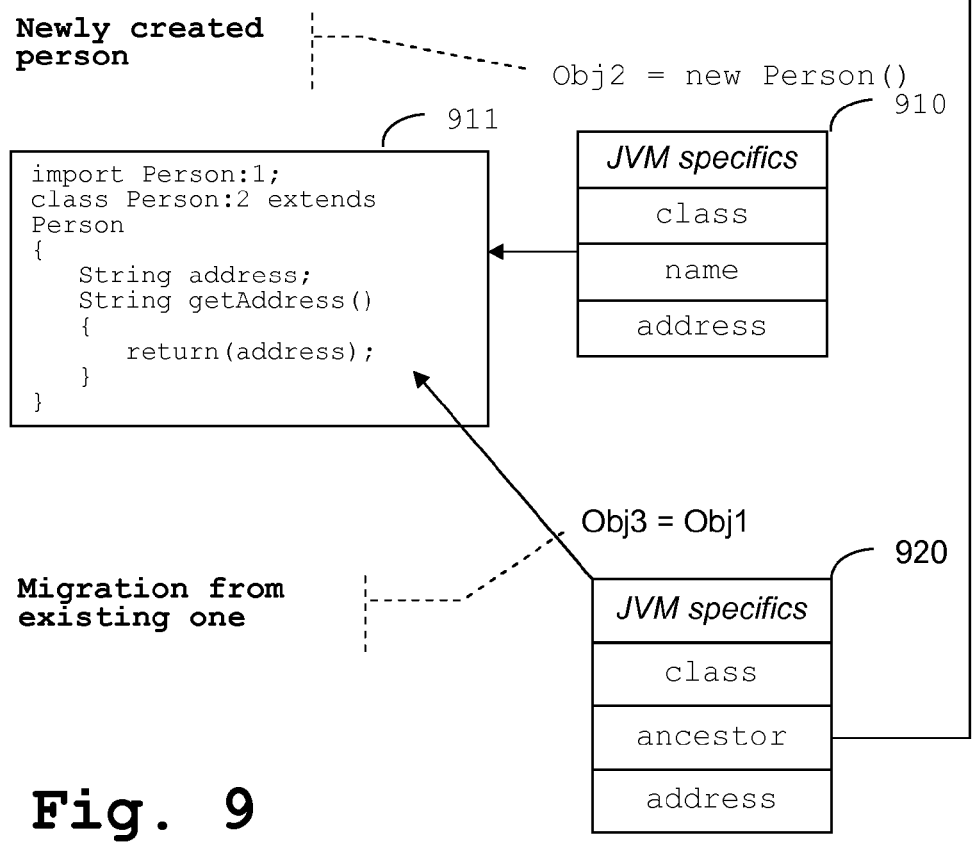
FIG. 9 shows the migration step of the runtime Java object migration on class version upgrade.

FIGS. 8 and 9 illustrate a further embodiment of optimizing the migration of existing object instances when a new version of a class is loaded. According to this embodiment, a particular way to define a new class version is provided which allows identifying only the differences between old and new class version. The JVM is modified to allow object migration only by adding these missing parts to existing objects that stay unchanged. This lead to a considerable saving of time and space spent in object migration.

FIG. 8 shows coexistence of the different class versions.

The figure shows the creation step of the runtime Java object migration on class version upgrade.

The element 801 is a first version of the class Person that has been loaded by the JVM. Element 800 represents an instance of this class, created either using explicit reference to the full class name including the version (Person:1), or created using the atomic class name "Person" but before loading a more recent version.

The element 811 is the source code of a newer class Person:2 extending the previous version "Person:1". The element 810 represents an instance of this new class "Person:2", that may be created using the atomic class name "Person" as "Person:2" is the most recent class version at that time.

A dynamic class upward migration is simplified by adding only class extension to existing objects. A class extending another one may add new attributes (extensions to memory footprint). Alternatively it may add or replace methods.

Defining a new version of a class by extending the previous one allows guaranteeing upward compatibility between versions. It also allows identifying what are the added elements of the objects.

Upgrading an existing object can be done by adding only new elements. A new separate memory block is allocated to handle added attributes (if any). Alternatively, new methods are invoked instead of old ones.

When a newer class version is loaded, it coexists with older version. Newly created object instances are created with the latest class version. Existing object instances may be migrated by adding only missing elements: for example, new attributes (extensions to memory footprint) or new (or replaced) methods. Existing objects are kept in memory as they are.

FIG. 9 shows the migration step of the runtime Java object migration on class version upgrade.

Element 901 is a first version of the class Person. The element 900 represents a first instance of the class Person created in the Java runtime.

After this creation, a new version "Person:2" of the class Person is loaded, represented by the element 911. The element 910 represents a new instance of this new class Person, created with the same code than for element 900, but which lead to a new memory representation that includes adds of "Person:2".

The element 920 is an instance of the new class "Person:2" that is a migration of the existing instance of "Person:1" represented by 900. Contrarily to the previous case represented by 910, only the missing attributes are present in the object descriptor, plus a reference to the ancestor which allows getting values of existing fields directly in the older object. This allows also to maintain existing references to the previous object 900 but to make it viewable in a promoted way as a "Person:2".

The invention can take form of an entirely hardware embodiment, an entirely software embodiment or an embodiment containing both hardware and software elements. In a preferred embodiment, the invention is implemented in software, which includes but is not limited to firmware, resident software, microcode, etc. In a high performance system, a hardware implementation of embodiments of the invention may prove advantageous for example.

Furthermore, the invention can take the form of a computer program product accessible from a computer-usable or computer-readable medium providing program code for use by or in connection with a computer or any instruction execution system. For the purposes of this description, a computer-usable or computer-readable can be any apparatus that can contain, store, communicate, propagate, or transport the program for use by or in connection with the instruction execution system, apparatus, or device.

The invention claimed is:

1. A method of handling a given object class in an object-oriented environment, comprising, in response to an invocation of the given object class during runtime:
   determining if a version associated with the object class differs from a predefined minimal version, wherein the predefined minimal version is specified at class import declaration, and wherein the predefined minimal version is specified by extending an import statement to define a range of versions and if so:
      generating a new version of the object class from the version of the object class by invoking an interface method migrating an object class from one version to another in the same runtime environment, without serialization of objects; and
      extending the new object class by updating pointer links to a previous version of the given object class.

2. The method of claim 1, further comprising:
   maintaining the previous version of the object class accessible after the object migration.

3. The method of claim 1, wherein a definition of inheritance is extended to support multiple versions by allowing during import an object class to extend an object class with a similar name and of a lower version or none.

4. The method of claim 1, further comprising:
   executing the given object class.

5. The method of claim 1, wherein the object class is a Java™ class.

6. The method of claim 5, wherein object class attributes are accessed by getter or setter functions.

7. A computer program encoded on a non-transitory computer readable storage medium for performing a method for handling a given object class in an object-oriented environment, in response to an invocation of the given object class during runtime, when executed by a computer device, the method comprising:
   determining if a version associated with the object class differs from a predefined minimal version, wherein the predefined minimal version is specified at class import declaration, and wherein the predefined minimal version is specified by extending an import statement to define a range of versions and if so:
      generating a new version of the object class from the version of the object class by invoking an interface method migrating an object class from one version to another in the same runtime environment, without serialization of objects; and
      extending the new object class by updating pointer links to a previous version of the given object class.

8. The computer program of claim 7, the method further comprising:
   maintaining the previous version of the object class accessible after the object migration.

9. The computer program of claim 7, wherein a definition of inheritance is extended to support multiple versions by allowing during import an object class to extend an object class with a similar name and of a lower version or none.

10. The computer program of claim 7, the method further comprising:
    executing the given object class.

11. The computer program of claim 7, wherein the object class is a Java™ class.

12. The computer program of claim 11, wherein object class attributes are accessed by getter or setter functions.

13. A system, including a processor coupled to a memory, for handling a given object class in an object-oriented environment, in response to an invocation of the given object class during runtime, by performing a method, the method comprising:
    determining if a version associated with the object class differs from a predefined minimal version, wherein the predefined minimal version is specified at class import declaration, and wherein the predefined minimal version is specified by extending an import statement to define a range of versions and if so:
    generating a new version of the object class from the version of the object class by invoking an interface method migrating an object class from one version to another in the same runtime environment, without serialization of objects; and
    extending the new object class by updating pointer links to a previous version of the given object class.

14. The system of claim 13, the method further comprising:
    maintaining the previous version of the object class accessible after the object migration.

15. The system of claim 13, wherein a definition of inheritance is extended to support multiple versions by allowing during import an object class to extend an object class with a similar name and of a lower version or none.

16. The system of claim 13, the method further comprising:
    executing the given object class.

17. The system of claim 13, wherein object class attributes are accessed by getter or setter functions.

* * * * *